Feb. 18, 1958   L. R. MURPHY   2,823,911
PORTABLE HEAVY-DUTY WEIGHING SCALE
Filed Nov. 6, 1952   6 Sheets-Sheet 1
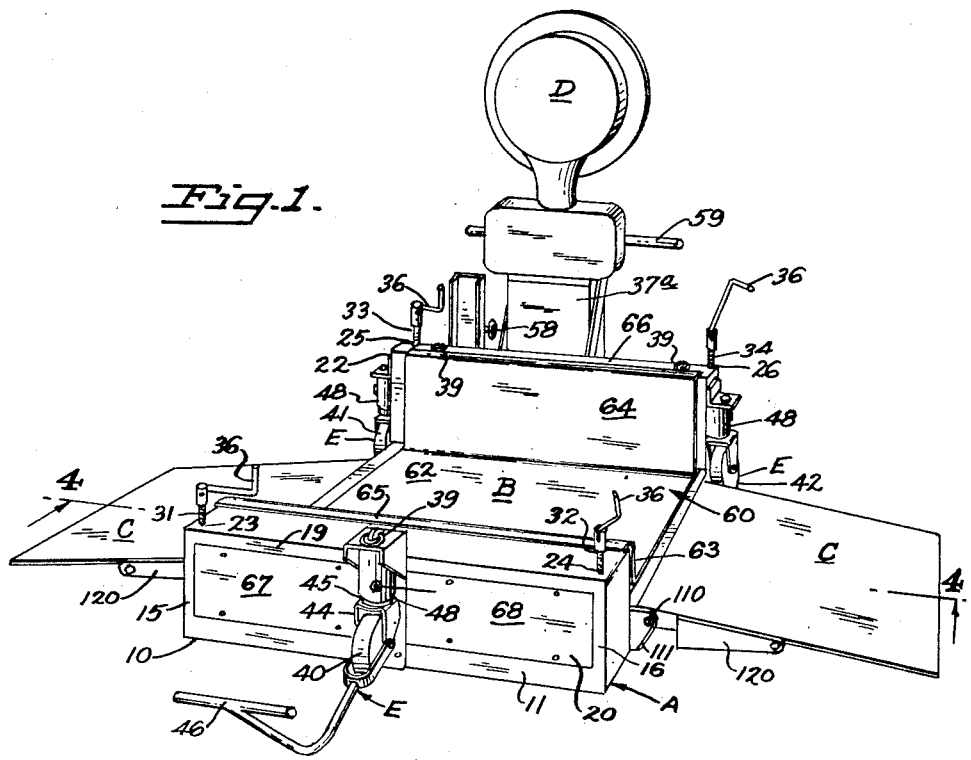
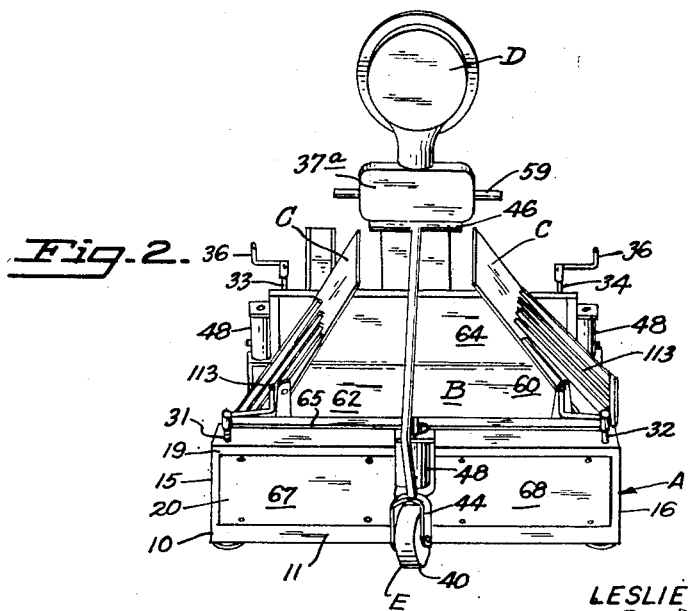
INVENTOR.
LESLIE R. MURPHY
BY
ATTORNEY Feb. 18, 1958   L. R. MURPHY   2,823,911
PORTABLE HEAVY-DUTY WEIGHING SCALE
Filed Nov. 6, 1952   6 Sheets-Sheet 2

INVENTOR.
LESLIE R. MURPHY
BY
ATTORNEY

Feb. 18, 1958   L. R. MURPHY   2,823,911
PORTABLE HEAVY-DUTY WEIGHING SCALE
Filed Nov. 6, 1952   6 Sheets-Sheet 4

Fig. 5.

INVENTOR.
LESLIE R. MURPHY
BY
ATTORNEY

Feb. 18, 1958    L. R. MURPHY    2,823,911
PORTABLE HEAVY-DUTY WEIGHING SCALE
Filed Nov. 6, 1952    6 Sheets-Sheet 5
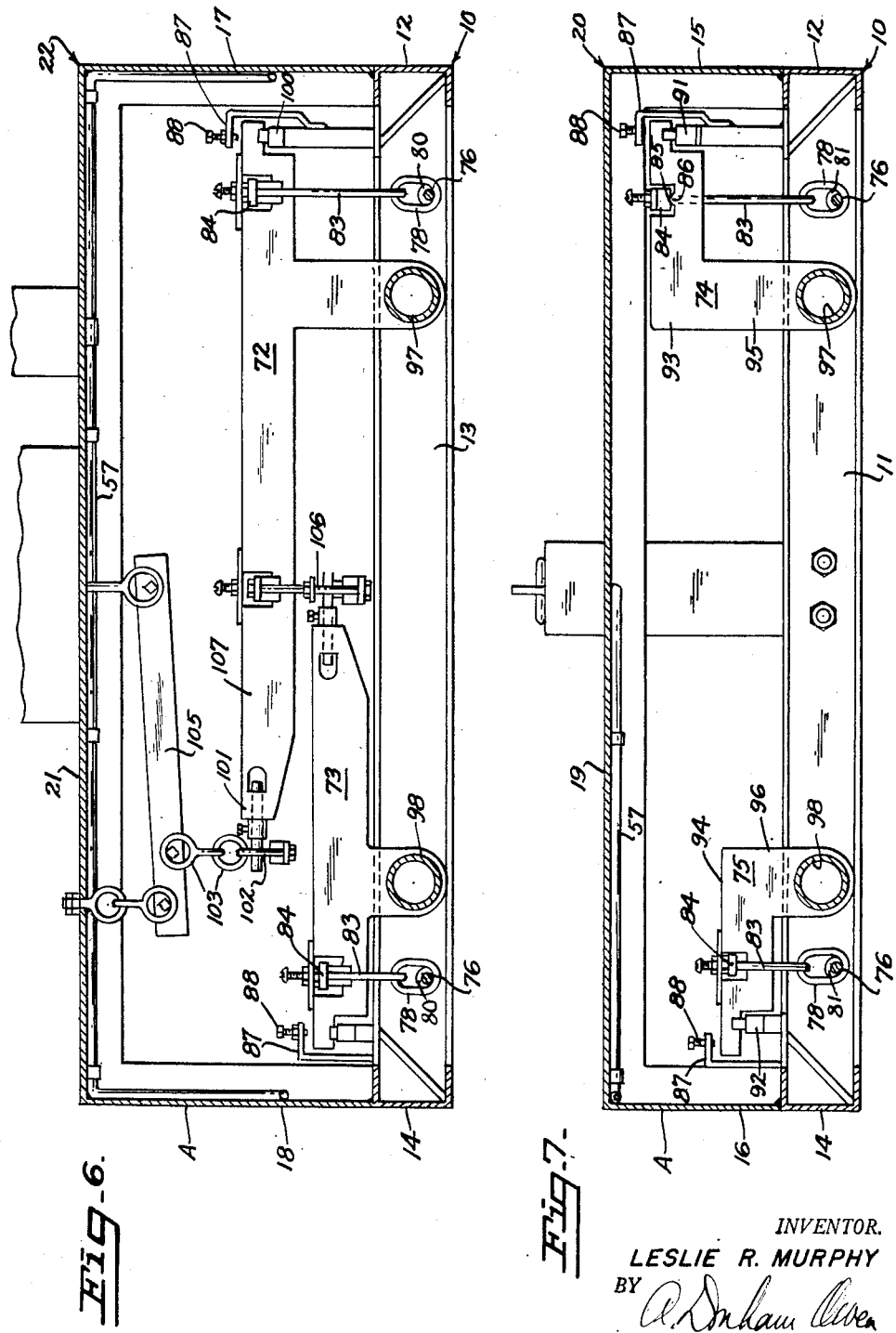
INVENTOR.
LESLIE R. MURPHY
BY
ATTORNEY Feb. 18, 1958     L. R. MURPHY     2,823,911
PORTABLE HEAVY-DUTY WEIGHING SCALE
Filed Nov. 6, 1952     6 Sheets-Sheet 6
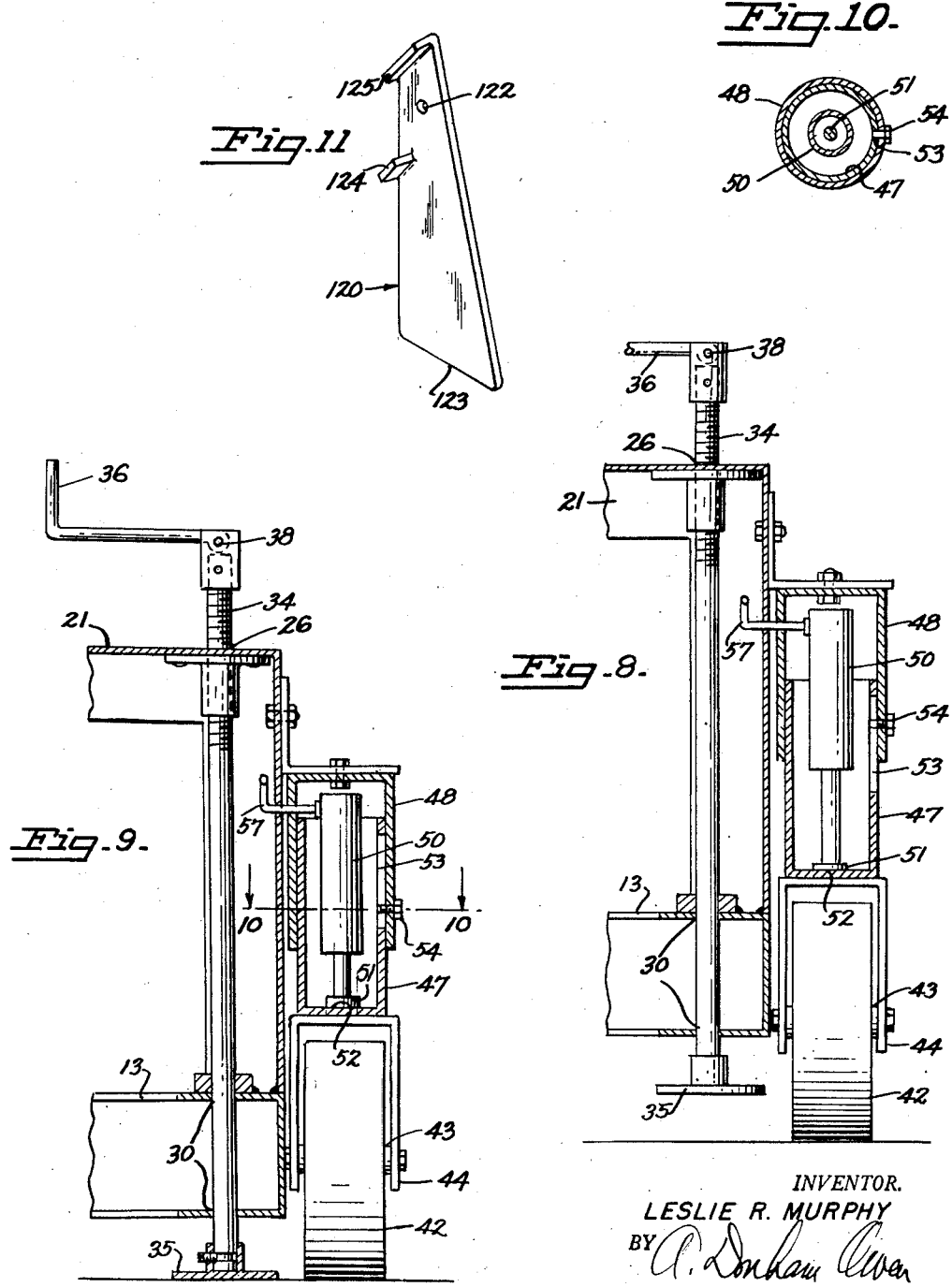
INVENTOR.
LESLIE R. MURPHY
BY
ATTORNEY

United States Patent Office 2,823,911
Patented Feb. 18, 1958

2,823,911

PORTABLE HEAVY-DUTY WEIGHING SCALE

Leslie R. Murphy, Sacramento, Calif.

Application November 6, 1952, Serial No. 319,155

11 Claims. (Cl. 265—55)

This invention relates to a portable heavy-duty weighing scale.

In cotton warehouses the heavy bales are stored over vast areas, so that it is not practical to bring all the bales to a single permanently-located scale. Relatively primitive steel-yards have been moved about from place to place, hung up, a bale lifted onto a hook, and the counterweight shifted to bring it into balance. All the advantages of modern dial-type scales were lost and the movement of the bales was awkward and difficult.

This situation is typical of the problems solved by the present invention and illustrates the obvious inconvenience, slow operation, and frequent inaccuracy which typified the prior art and which are eliminated by my new quick-operating wheel-borne platform scale.

Previous attempts had been made to provide platform scales with ramps for hand trucks, wheels that could be let down for moving the scale about and retracted during actual use, and large easy-to-read dials. However, these portable heavy-duty scales had not come into general use; they had not even made substantial inroads upon the ancient steelyard, because heretofore they had numerous disadvantages that are solved for the first time by the present invention.

Heretofore, the platforms of portable heavy-duty scales were too high, making it unreasonably difficult to wheel heavy loads up the ramps on hand trucks, and it was believed that the platforms had to be high to accommodate portions of the scale lever system. Also the platforms tended to sway and swing on their pivots while the scale was being moved from place to place, unless considerable time was taken to clamp the platform against the frame. Unless so clamped, the lever system was sometimes disconnected and damaged, and the pivots were often displaced from their bearings.

Heretofore, also, it took too long to set down or retract the wheels. It took several minutes to ready the scale for movement after it had been set up for weighing, and it took just as long to set it up for weighing again after it had been moved. The wheels were difficult to steer. The platform was difficult to level. In fact, there were so many things wrong with movable platform scales, that cotton warehousemen found the awkward steelyard faster and easier to use.

By incorporating a new combination of elements, I have produced a portable scale that has none of these disadvantages: it is swift in operation, is quickly and easily set up for weighing or connected for movement, is easily steered, and is free from the distressing swaying and swinging during movement, because the parts are held steady. The platform is only about four inches off the ground, so that a hand truck with a heavy load can easily be pushed up a relatively short ramp.

In addition to the frame, ramps, and platform, the scale includes a novel lever system placed in housings at the ends of the platform rather than beneath the platform. Only two linking members pass beneath the platform and connect the levers in one housing to those in the other. The frame is mounted on three wheels, all of which are lowered and retracted rapidly by hydraulic rams powered by a single hydraulic cylinder. Screw jacks are provided for leveling the frame when it is in place. During movement from place to place, a lever pivotally secured to the ramps not only holds the ramps in an elevated position that prevents strain from twisting either them or their platform, but holds the platform steady in a depressed position, to prevent the levers from working loose from their bearings.

From what has already been said, it will be seen that among the objects of my invention are: to provide a portable heavy-duty scale that is truly portable, that is rugged and foolproof, is protected from damage or displacement during movement, that has a platform that is low to the ground, that is quickly moved and quickly set up, and that can quickly be made ready for accurate weighing.

Other objects and advantages of the invention will appear from the following description. This disclosure is specific, in accordance with United States Revised Statutes, Section 4888, so that others will know how to practice my invention. However, I do not wish to be misunderstood: these details are not intended to place narrow limitations upon the construction of the appended claims which accurately state the scope of the invention.

In the drawings:

Fig. 1 is a view in perspective showing a scale embodying the principles of the invention. The scale is shown in weighing position, with the ramps lowered to the ground.

Fig. 2 is a view in perspective of the scale of Fig. 1 with the ramps raised and the scale ready to be moved.

Fig. 5 is a plan view in section taken along the line 5—5 in Fig. 4, but with both ramps lowered, the corner of one being broken off.

Fig. 6 is an enlarged view in section taken along the line 6—6 in Fig. 5, showing the lever system inside the rear housing, the parts thereabove being broken off and the wheels and wheel housings omitted.

Fig. 7 is an enlarged view in section taken along the line 7—7 in Fig. 6, showing the lever system inside the forward housing.

Fig. 8 is an enlarged view in elevation and in section of one of the rear wheel housings and adjacent portions, the wheel being shown supporting the scale frame off the ground.

Fig. 9 is a view similar to Fig. 8 showing the scale frame lowered on to the ground.

Fig. 10 is a view in section taken along the line 10—10 in Fig. 9.

Fig. 11 is a view in perspective showing the leg that supports and braces the ramp on the scale platform when the ramps are in their raised position.

*General description*

Figure 3:
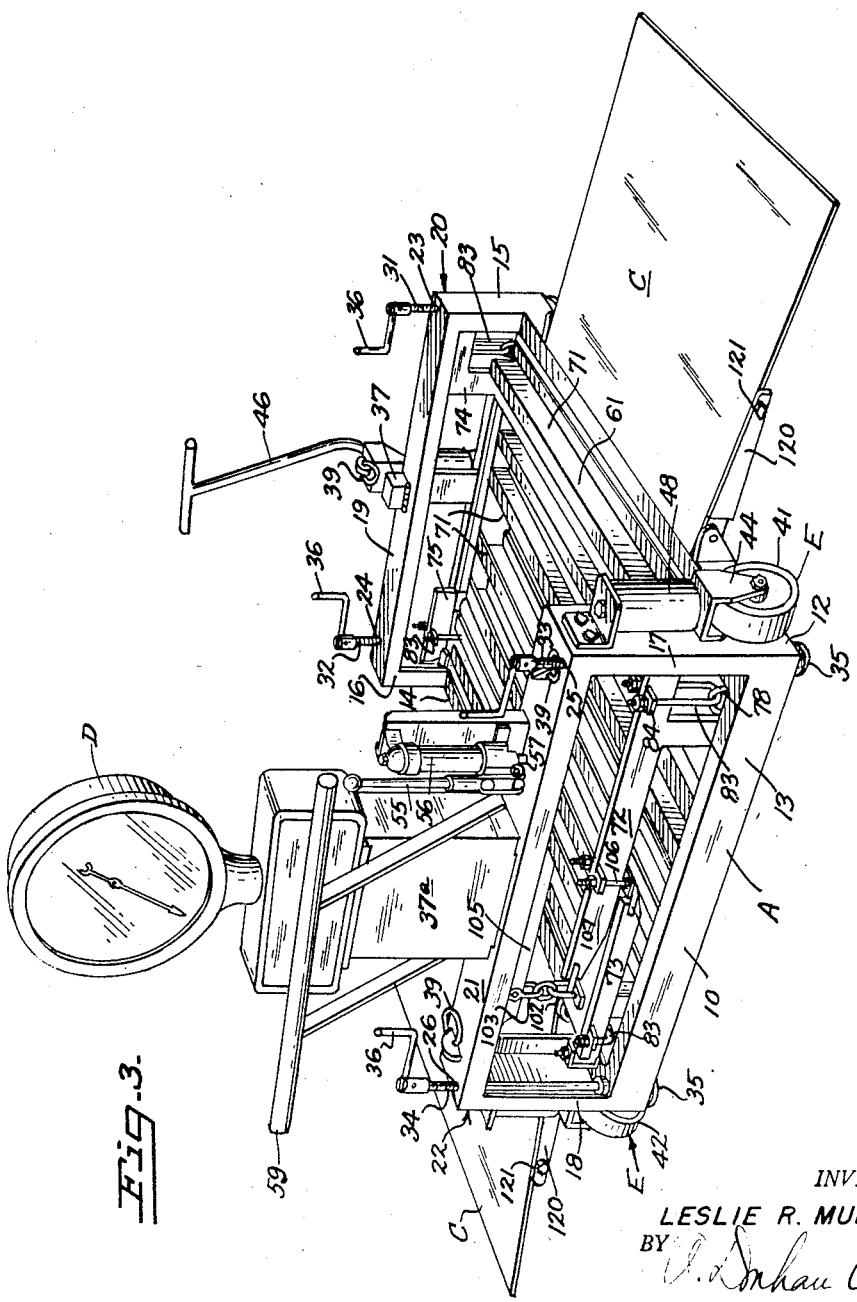
Fig. 3 is a view in perspective looking from the direction opposite to Fig. 1, with the scale platform and the housing end plates removed to show the sub-platform and the weighing levers.

The scale shown in the drawings, by way of illustration, includes a main frame A in which is suspended a weighbridge B. With the scale in its weighing position, as in Fig. 1, a load may be pushed up either ramp C onto the weighbridge B, and the weight acts through a lever system that registers on the dial D. When the scale is to be moved, the ramps C are moved to the position shown in Fig. 2, and three hydraulically actuated wheels E are projected down to support the frame A.

The main frame A

The frame A includes a rectangular base 10 which may be made from four channel irons 11, 12, 13, and 14, each about four inches high. At each corner of the base 10, uprights 15, 16, 17, and 18 are provided, as by welding channel irons to the base 10. The shorter uprights 15, 16 at the forward end are bridged by a channel iron 19 to form the frame for a forward housing 20. The taller uprights 17, 18 are also bridged by a channel iron 21 to form the frame of the rear housing 22, which supports most of the scale levers and the dial D.

Adjacent each end, the channel irons 19 and 21 are provided with threaded openings 23, 24, 25, 26, and similar unthreaded openings 27, 28, 29, 30 extend through the base irons 11 and 13 directly beneath the threaded openings. Threaded jacks 31, 32, 33, 34 extend vertically down through these respective openings to form legs that support the frame A. A foot plate 35 (see Fig. 8) is provided at the bottom of each jack 31, 32, 33, 34, and a crank 36 is secured to the upper end. By turning any one crank 36, its corner of the frame A may be raised or lowered relative to the other corners, and in this manner the frame A may be leveled whether or not the floor it rests on is level. Levels arranged in the shape of a T may be provided in a housing 37 located at the center of each upper channel iron 19 and 21 to indicate when the frame is level. (The housing 37 at the rear end is inside the upper scale housing 37a.) The crank handles 36 are preferably pivoted at 38 so that they may be swung about 95° into a position that is out of the way where they are not likely to be accidentally struck by a passer-by or anyone operating the scale.

For handling the scale by derricks, three lifting anchor rings 39 may be provided on the upper surface of the housings 20 and 22.

The wheels E and the hydraulic system

When the frame A is to be moved, its weight is carried by three wheels 40, 41, 42, so placed as to result in very good maneuverability and stability. The wheel 40 is located at the front center and the wheels 41 and 42 are at each side of the rear housing 22. Each wheel 40, 41, 42 is supported on an axle 43 (see Fig. 8) in a yoke 44. The yoke 44 of the front wheel 40 is mounted on a swivel 45 (Figs. 1 and 2) and has a handle 46 pivoted to it, by which the scale may be pulled. The other yokes 44 do not swivel, and their wheels 41, 42 do not turn relatively to the frame A.

A round tubular column 47 projects up from each yoke 44 and is slidable up and down inside a stationary cylindrical tube 48. One tube is secured to the center of the forward edge of the front housing 20, and the other stationary tubes 48 are fixed to the opposite ends of the rear housing 22. A hydraulic cylinder 50 fits in the upper end of each tube 48, and its ram 51 lies inside the column 47 and bears against the closed lower end 52 of the column 47. The columns 47 are held against rotation relative to the tube 48 by a slot 53 that is guided by a stud 54 on each tube 48 (Fig. 10).

All three hydraulic rams 51 are powered from a single pumping lever 55 that sends fluid under pressure from a reservoir 56 to the three hydraulic cylinders 50 through a conduit 57 that is supported by the frame A. A release valve 58 (Fig. 1) lets off the pressure when that is desired. The hydraulic system may of course be "pneumatic" instead of literally "hydraulic," and the term hydraulic, when used herein, is meant to be construed broadly.

By pumping the lever 55 a few times, the rams 51 first travel across a lost motion gap and then into engagement with the closed end 52 of the hollow column 47. Further travel of the rams forces the wheels 40, 41, 42 down until they support the frame A free of the ground, the ram 51 preferably having a stroke long enough to raise the frame A about three inches off the floor, so that the scale can be moved to another location. When the scale is in place, a turn of the valve 58 lets the frame A down on the feet 35 where it is not supported on the wheels.

In addition to the pull handle 46, a handle 59 may be provided on the rear housing 22, so that one man may push the scale while another man is pulling. It may also be towed by a power truck, such as a fork-lift truck or jitney.

The weighbridge B and the lever system

The weighbridge B includes a platform 60 that is supported on a sub-platform 61. The platform 60 preferably comprises a roughened deck 62 with vertical plates 63 and 64 extending up from each end and provided with horizontal out-turned flanges 65, 66 to overlie the housings. The plates 63, 64 cover the inner faces of the housings 20, 22, the outer faces being covered by a large rear plate (not shown) and two small front plates 67, 68, so that the levers and bearings in the housings 20, 22 are protected. The plates 63, 64 also prevent an object being weighed from touching the frame A and thereby causing errors in weighing.

The sub-platform 61 (Figs. 3 and 5) may comprise two end channels 70, with a plurality of channels 71 or angle irons joining them together rigidly, eight channels 71 being shown (Fig. 3). The sub-platform 61 fits inside the base 10 free of contact therewith and is held by a suspended link connection to four levers (Fig. 3): a main lever 72 and a subordinate lever 73 in the rear housing 22, and two ancillary levers 74, 75 in the forward housing 20.

Each of the four suspended link connections comprises a pin 76 journaled in the sub-platform 61 and held in a lower link 78. Spacer rings 80, 81 are provided on each side of the link 78 to align the pin 76 properly, and a cotter pin prevents it from falling out of the sub-platform 61. The lower link 78 is suspended from an upper link 83, which is bolted to a bearing block 84. The block 84 has a broad V-shaped bearing 85 that rests on a knife edge 86 which is secured to each lever 72, 73, 74, 75.

All the levers in this scale, including the levers 72, 73, 74, 75 are second-class levers, with the power and the load both being on the same side of the fulcrum. In each instance when a knife-edge and bearing pivot is provided, whether at the fulcrum or elsewhere, keeper means are provided to prevent the knife from coming out of its bearings while the scale is moved. This comprises a bracket 87, such as is held on the lever 72 and has a bolt 88 that is threaded therethrough nearly into contact with the block 84. To prevent the weighbridge from swaying too far horizontally (sidewise and lengthwise) and vertically during moving of the scale, bumpers 90 are provided, which may be screw threaded horizontally in the frame 10 and projecting in to a point very near to the sub-platform 61.

The ancillary levers 74 and 75 serve to distribute the weight on the platform 60 evenly, so that the dial D will indicate the same weight, no matter where the load is placed. The levers 74, 75 have fulcrums 91, 92, keeper bolts 88 being provided directly above the levers 74, 75 at each fulcrum to limit the play there and prevent the levers from getting loose when the scale is moved about. The outer ends 93, 94 of the levers 74, 75 are secured to bars 95, 96 which are respectively secured to rods 97, 98. The rods 97, 98 extend lengthwise of the scale and each lies in between two adjacent parallel bars 71 and free from contact with the bars 71 and the end channels 70.

The rods 97, 98 are the only portion of the lever system that pass beneath the platform 60 and they are smaller in diameter than the height of the base 10, so that they do not interfere at all with keeping the platform low.

The principal levers are all housed at the rear end of the scale, which also supports the dial D. The main lever 72 is supported on a fulcrum 100, which is a knife on a V-shaped bearing, as in the case of every pivot for every lever in the device and is supported on the base 10. The load bearing 85 rests on the knife edge 86, and the outboard end 101 of the lever 72, which may be about twelve times as far from the fulcrum 100 as the knife edge 86, is suspended by links 102, 103 from a shelf lever 105.

The subordinate lever 73 is connected to and in effect part of the main lever 72, by virtue of a connected link suspension at 106. The proportions of the levers are such that the effective length from the fulcrum to the outboard end 101 of the lever 72 is the same, whether measured solely along the lever 72 or along the lever 73 and back along the portion 107 of the lever 72.

The shelf lever 105 is connected by suitable rods and levers to the dial head, so that the dial D indicates the weight in the normal manner. The connection from the shelf lever 105 to the dial head is conventional. A weigh beam (not shown) may, of course, be substituted for the automatic dial head.

The ramps C

The ramps C are generally rectangular members, each pivoted to the base 10 by means of a pair of suitable pins 110 that are journaled into brackets 111 in the base 10 and brackets 112 on each ramp C. Suitable wedge-shaped reinforcing ribs 113 may be welded to the bottom of each ramp and aid in its support.

A novel feature of this invention involves the combination of a leg 120 (see Fig. 11) for supporting the ramps C in their upper position while the scale is being moved. For this purpose the end reinforcing rib 113 holds a pivot pin 121 and the leg 120 is provided with an opening 122, so that it may freely rotate about the pin 121. The leg 120 is generally wedge-shaped and has a lower end 123 that is adapted to lie flat on the platform 60 when the ramp C is swung inwardly.

Stops 124 and 125 are provided on the leg 120. The stop 124 abuts the ramp C to prevent the leg 120 from swinging too far in when the ramp C is raised. The stop 125 abuts the ramp C to prevent the leg 120 from falling down too far when the ramp C is in its lowered position (see Fig. 4).

Operation

When the scale is first received by railroad or motor freight, it is lifted on to the floor usually by an overhead derrick attached to the three rings 39. In order to move it about in the warehouse and to get it to the position where it will weigh, the lever 55 is pumped to cause the hydraulic rams 51 to bear down on the wheel columns 47 and project the wheels 40, 41, 42 down below the base 10, thereby lifting the frame A so that it is supported by the wheels C. Depending on the roughness of the floor and so on, the frame A may be lifted any distance up to about three inches clear of the floor. During shipment, the ramps C are held in an elevated position with the legs 120 resting on the platform 60 (Fig. 2). For moving the scale about, the ramps C are left in this position and the weight of the ramps carried through the legs C helps keep the platform 60 steady during movement. During transportation the dial D is usually crated separately, and if this has been done, it will be installed and connected to the lever system prior to using the scale.

With the scale resting on the three wheels 40, 41, 42, it may be moved merely by an operator pulling the handle 46. For going uphill or for going faster and easier, another operator may push on the handle 59 which extends up from the rear housing 22. The scale may then be rolled anywhere that it is desired, turns being made simply by moving the front handle 46 which causes the front wheel 40 to swivel into any desired position. The rear wheels 41, 42 do not swivel, and therefore the device is easy to steer. Also, it may be turned around in a radius corresponding to approximately its own width, one of the rear wheels 41, 42 remaining substantiatlly on the same spot as the scale is turned around.

Once the scale is brought to the desired location, the valve 58 is turned, and the fluid pressure is released, thereby retracting the hydraulic rams 51 so that the scale settles down on the four feet 35 on the jacks 31, 32, 33, 34. The wheels 40, 41, 42 are left supporting nothing but their own weight (Fig. 9).

If the scale is not perfectly level as indicated by the levels 37, the cranks 36 are turned at the appropriate jack screws 31, 32, 33, 34 to change the height of one or more of the feet 35 relative to the base 10. When the scale is perfectly level, or earlier if desired, the ramps C may be swung about their pivots 110 so that their outer edges are in contact with the floor (Fig. 1). The leg 120 falls with its own weight into the position shown by the right-hand side of Fig. 4 with its lug stop 125 in contact with its ramp C so that it will fall no further.

All this readying for operation, including the release of the wheels and the lowering of the ramps takes only a few seconds and, if leveling is necessary (usually it is not), only a few seconds more will be required.

With the scale in the position shown in Fig. 1 the load may be wheeled up by a hand truck over one of the ramps C and on to the scale platform 60. There the weight of the load and of the hand truck (which is usually compensated for on a tare beam, not shown) bears on the platform 60 and sub-platform 61.

This weight swings the four levers 72, 73, 74, 75 downwardly causing the outboard end 101 of the main lever 72 to swing down a greater amount. The movement of the two ancillary levers 74, 75 is transmitted to the main lever 72 through the rods 97, 98 and the movement of the subordinate lever 73 is also transmitted to the main lever 72. The total movement down of the platform 60, even when fully loaded, will usually not exceed about 1/16 of an inch, and the fact that the rods 97, 98 are the only parts of the lever system which extend beneath the platform 60, means that the scale platform 60 can be very low, making it easier to push objects up the ramp C. The downward movement of the outboard end 101 of the lever 72 pulls down on the shelf lever 105 thereby causing its outboard end to swing down a greater amount and to actuate through other rods and levers the conventional dial mechanism so that the dial D will indicate the weight on the platform usually as compensated by tare.

Figure 4:
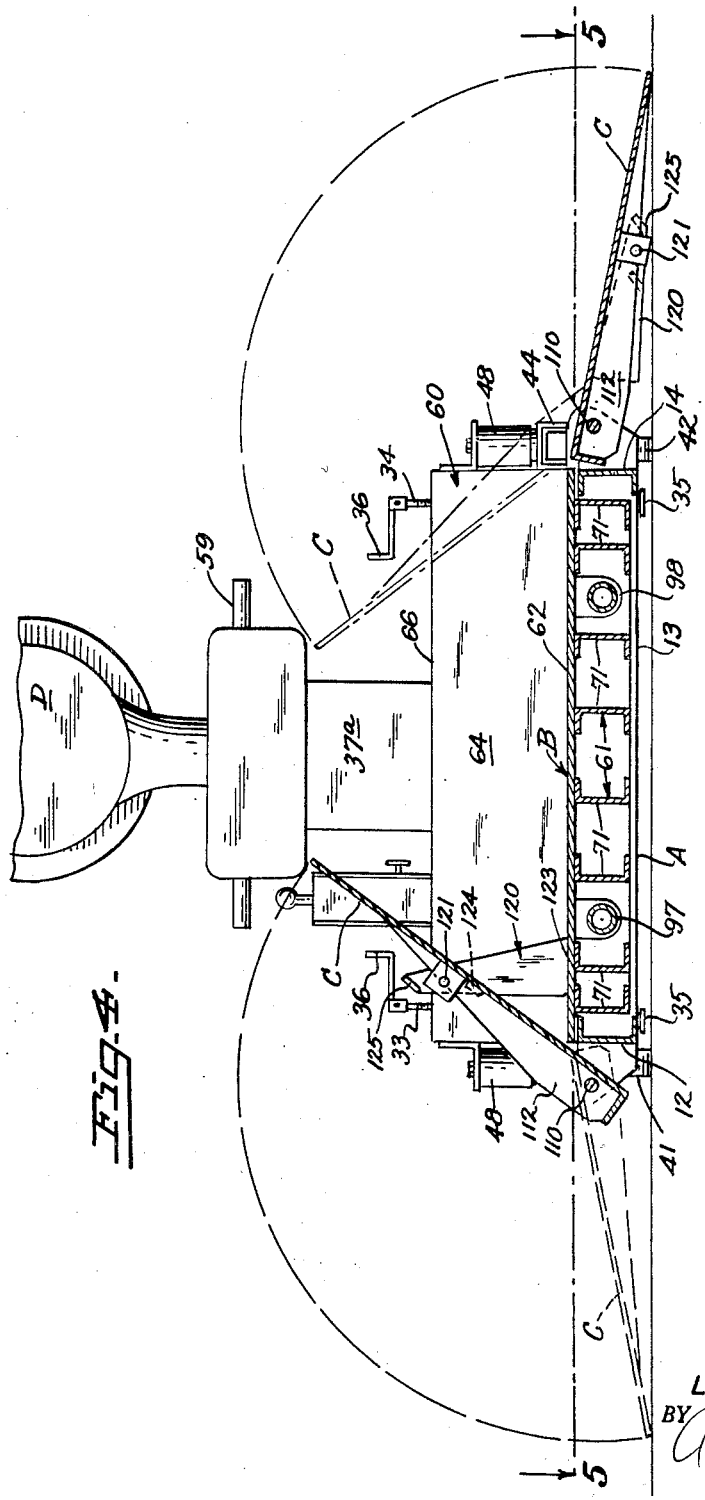
Fig. 4 is a view in elevation and in section taken along the plane 4—4 in Fig. 1, but with one ramp raised. The ramps are shown in dotted lines in their opposite extreme positions.

When all the weighing at one station has been finished and it is desired to move the scale to another station, the ramps C are lifted and the leg 120 of each ram C falls into place on the platform 60 (Fig. 2 and left-hand side of Fig. 4). The stop 124 engages the ram C to prevent further movement. Then the lever 55 is pumped to force the wheels 40, 41, 42 down and raise the frame A. This get-ready operation usually takes considerably less than a minute, as compared with previous scales of this general type which often took five or ten minutes to get ready and an equal time at the opposite end to get them ready for weighing.

It will be seen from the above how the scale is quick-acting and can be quickly changed from its moving position to its weighing position and vice versa, how it can be maneuvered easily and how the scale lever position is protected during movement, and how the scale lever system, being contained in the housing 20 and 22, does not interfere with the height of the platform 60.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A portable heavy-duty scale including in combination a main frame having a rectangular base, a front housing at one end, and a rear housing at the other end; three wheels for supporting said frame, one wheel at each side of the rear housing and one wheel just forward of the center of the front housing; means for supporting said wheels in retractable relation to said frame comprising a yoke supporting each said wheel, said yoke having a hollow column extending upwardly therefrom, the lower end of said column being closed, said frame having a hollow cylinder to receive each column for sliding movement up and down; a hydraulic ram for retracting and projecting said wheels, including a ram cylinder and a piston in each said hollow cylinder bearing against said closed lower end of said column; a single pressure cylinder for powering simultaneously all said rams; and a single release valve for releasing the hydraulic pressure and retracting said wheels; a main lever system in the rear housing; an ancillary lever system in the front housing, a weighbridge supported by the levers in both said front and rear housings; rods extending beneath said weighbridge between the lever system in the rear housing and the lever system in the front housing to link these systems together; and weight indication means adjacent the rear housing actuated by said lever system.

2. The scale of claim 1 in which each said column is splined to its said hollow cylinder against relative rotation and in which the front wheel yoke includes a swivel and a handle, whereby only the front wheel turns.

3. A portable heavy-duty scale including in combination a main frame having a rectangular base, a front housing at one end, and a rear housing at the other end; three wheels for supporting said frame, one wheel at each side of the rear housing and one wheel just forward of the center of the front housing; means for supporting said wheels in retractable relation to said frame; means for retracting and projecting said wheels; a main lever system in the rear housing; an ancillary lever system in the front housing, a weighbridge supported by the levers in both said front and rear housings; rods extending beneath said weighbridge between the lever system in the rear housing and the lever system in the front housing to link these systems together; movement-limiting means directly over the pivot points of each of the levers in said lever systems so as to limit the vertical movement of the levers with respect to their bearings at the pivot points and prevent them from becoming detached at the pivot points during movement; screws extending horizontally through the frame toward said weighbridge to restrain sidewise and vertical movements of said weighbridge; and weight indication means adjacent the rear housing actuated by said lever system.

4. A portable heavy-duty scale including in combination a main frame having a rectangular base, a front housing at one end, and a rear housing at the other end; retractable wheels supporting said frame; a pair of levers, one fulcrumed at a pivot adjacent each opposite end of the rear housing; a pair of ancillary levers, one fulcrumed at a pivot adjacent each end of the front housing; a sub-platform comprising a plurality of parallel bars and end crosswise members, said sub-platform being supported adjacent its four corners and solely by said levers; a weighing platform resting on said sub-platform; a pair of rods extending through said sub-platform, between and parallel to said parallel bars beneath said platform, said rods being of a diameter not exceeding the height of said bars, and lying between the horizontal planes of the bars' upper and lower surfaces so that said rods do not increase the height of the weighbridge at all, each said rod extending from one lever in the rear housing to its corresponding lever in the front housing, to link these levers together; weight indication means supported by the rear housing actuated by the pair of levers in said rear housing; means secured to said frame directly over each pivot for restraining the movement of each of said levers, so as to prevent them from getting off their pivots; screw means secured to said frame and extending in horizontally toward said sub-platform for limiting the sidewise movement and lengthwise movement of said sub-platform to prevent damage to said scale; and means bearing on said platform during movement of said scale from place to place to restrain vertical movement of said platform and sub-platform.

5. A portable heavy-duty scale including in combination a main frame having a rectangular base, a front housing at one end, and a rear housing at the other end; retractable wheels for supporting said frame during movement; four jackscrews for supporting said frame adjustably when said wheels are retracted; a main lever system in the rear housing; an ancillary lever system in the front housing, a weighbridge supported by the levers in both said front and rear housings; ramps pivoted to said frame on each side thereof and leading to said weighbridge; a member pivoted to each ramp for bearing against said weighbridge when said ramps are raised and thereby prevent movement of said weighbridge, and for supporting said ramps in their raised position; rods extending beneath said weighbridge between the lever system in the rear housing and the lever system in the front housing to link these systems together; and weight indication means in the rear housing actuated by said main lever system.

6. The scale of claim 5 in which each said member has two stops, one for engaging said ramp in its lowered position, the other to engage said ramp in its raised position.

7. A portable heavy-duty scale including in combination a main frame having a rectangular base, a front housing at one end, and a rear housing at the other end; jackscrews at each corner of said frame for supporting said frame; a swivel-mounted wheel at the center of said front housing; a pair of wheels at each side of said rear housing held from swiveling; hydraulic means for lifting said platform on said wheels; valve means for releasing the hydraulic pressure and letting said frame down free from said wheels and on said jackscrews; a pair of levers, one pivoted adjacent each frame corner in the rear housing; a pair of ancillary levers, one pivoted adjacent each corner in the front housing; a low sub-platform having spaced-apart lengthwise members and supported solely by said levers closely adjacent the ground level; a platform supported by said sub-platform; a pair of rods extending through said sub-platform between said spaced apart members and beneath said platform and above the lower surface of said lengthwise members, between one lever in the rear housing and its corresponding lever in the front housing to link these levers together; a pair of ramps pivotally secured to said frame, one on each side thereof between said housings; means for supporting said ramps above said platform in raised position; and weight indication means in the rear housing actuated by the pair of levers in said rear housing.

8. In a portable heavy-duty scale of the type having a wheel-supported main frame and a platform supported by a lever system which is connected to weight-indicating means, the combination of a pair of ramps pivoted to said frame so that they may be lowered with their outboard end in contact with the floor or may be raised up over the platform when the scale is being moved, and a leg associated with each of said ramps for free swinging movement with respect thereto and having a pair of stop members which limit the swing of said leg, one of said stop members engaging said ramp when the ramp is lowered into position to prevent said leg from falling beyond said ramp, and the other said stop member engaging said ramp when said ramp is raised to the position where the outboard end of said leg engages and bears upon said platform, whereby the weight of said ramps on said platform helps maintain the lever parts in place on their pivots during movement of the scale from place to place.

9. In a portable heavy-duty scale of the type having a wheel-supported main frame and a platform supported by a lever system which is connected to weight-indicating means, the combination of a pair of ramps pivoted to said frame so that they may be lowered with their outboard end in contact with the floor or may be raised up over the platform when the scale is being moved, and a leg with a flared outboard end associated with each of said ramps for free swinging movement with respect thereto and having a pair of projecting stops which limit the swing of said leg, one stop engaging the under surface of said ramp when the ramp is lowered into position to retain said leg generally parallel to said ramp, and the other stop engaging the under surface of said ramp when said ramp is raised to the position where its center of gravity lies above said platform and where the flared outboard end of said leg engages and bears squarely upon said platform, whereby the weight of said ramps transmitted to said platform by said legs helps maintain the lever parts in place on their pivots during movement of the scale from place to place.

10. A portable heavy-duty scale, comprising a main frame having a forward end and a rear end; three wheels supporting said frame, one said wheel being in the center of the forward end of said frame and being swivel mounted, and one said wheel being on each side of the rear end of said frame, said latter wheels being held parallel to said frame but freely rotatable on their axes; weight-indicating means on said frame; a lever system connected thereto and supported by said frame; a platform supported by said lever system; a pair of ramps pivoted to said frame so that they may be lowered with their outboard end in contact with the floor or may be raised up over the platform when the scale is being moved; and a leg associated with each of said ramps for free swinging movement with respect thereto, each said leg having a pair of lugs which limit the swing of said leg, one lug engaging said ramp when the ramp is lowered into position to prevent said leg from falling beyond said ramp, and the other lug engaging said ramp when said ramp is raised so that the outboard end of said leg engages and bears upon said platform, whereby the weight of said ramps on said platform helps maintain the lever parts in place on their pivots during movement of the scale from place to place.

11. A portable heavy-duty scale, comprising a main frame; three wheels supporting said frame, one of said wheels being a forward wheel being in the center of one end of said frame and being swivel mounted, and two of said wheels being rear wheels, one said rear wheel being on each side of the opposite end of said frame, the support for said rear wheels being splined to keep said wheels parallel to the axis of said frame; hydraulic means for projecting said wheels down to support said frame and to release the pressure holding said wheels beyond said frame, to set said frame down free from said wheels; weight-indicating means; a lever system connected thereto; a platform supported by said lever system; a pair of ramps pivoted to said frame so that they may be lowered with their outboard end in contact with the floor or may be raised up over the platform when the scale is being moved, and a leg associated with each of said ramps for free swinging movement with respect thereto, each said leg having a pair of lugs which limit the swing of said leg, one lug engaging said ramp when the ramp is lowered into position to prevent said leg from falling beyond said ramp, and the other lug engaging said ramp when said ramp is raised so that the outboard end of said leg engages and bears upon said platform, whereby the weight of said ramps on said platform helps maintain the lever parts in place on their pivots during movement of the scale from place to place.

References Cited in the file of this patent

UNITED STATES PATENTS

| | | |
|---|---|---|
| 1,528,899 | Thomas | Mar. 10, 1925 |
| 1,759,880 | Barrett et al. | May 27, 1930 |
| 1,759,885 | Bousfield | May 27, 1930 |
| 2,059,205 | Buffington | Nov. 3, 1936 |
| 2,358,770 | Carliss | Sept. 19, 1944 |
| 2,415,026 | Brown | Jan. 28, 1947 |
| 2,450,281 | Hudson | Sept. 28, 1948 |
| 2,452,110 | Dourte | Oct. 26, 1948 |
| 2,470,427 | Brodie | May 17, 1949 |
| 2,476,825 | Allen | July 19, 1949 |
| 2,603,369 | Soderstrom | July 15, 1952 |

FOREIGN PATENTS

| | | |
|---|---|---|
| 13,491 | Great Britain | 1895 |
| 407,154 | Great Britain | Mar. 15, 1934 |